United States Patent
Kook et al.

(10) Patent No.: US 9,715,121 B2
(45) Date of Patent: Jul. 25, 2017

(54) SWITCHABLE 3-DIMENSIONAL CONVERSION DEVICE, METHOD FOR MANUFACTURING THE SAME AND STEREOSCOPIC IMAGE DISPLAY DEVICE USING THE SAME

(75) Inventors: Yun-Ho Kook, Seoul (KR); Soon-Sung Yoo, Gyeonggi-do (KR); Chul-Ho Kim, Gyeonggi-do (KR); Hee-Jin Im, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1120 days.

(21) Appl. No.: 13/174,969

(22) Filed: Jul. 1, 2011

(65) Prior Publication Data

US 2012/0001890 A1    Jan. 5, 2012

(30) Foreign Application Priority Data

Jul. 2, 2010  (KR) .......................... 10-2010-0063661

(51) Int. Cl.
*G02B 27/22* (2006.01)
*G02B 27/26* (2006.01)
(Continued)

(52) U.S. Cl.
CPC ......... *G02B 27/26* (2013.01); *G02B 27/2214* (2013.01); *G02F 1/13394* (2013.01); *G02F 1/29* (2013.01); *G02F 2001/294* (2013.01)

(58) Field of Classification Search
CPC ............................ G02B 27/2214; G02B 27/26
(Continued)

(56) References Cited

U.S. PATENT DOCUMENTS

| 7,359,013 B2 * | 4/2008 | Sung | H04N 13/0409 |
| | | | 348/E13.03 |
| 8,482,597 B2 * | 7/2013 | Son | G02B 27/2242 |
| | | | 348/42 |

(Continued)

FOREIGN PATENT DOCUMENTS

| CN | 101419352 A | 4/2009 |
| CN | 101458412 A | 6/2009 |

(Continued)

OTHER PUBLICATIONS

GB Search Report dated Oct. 19, 2011 by the UK Intellectual Property Office for a counterpart GB patent application 1111241A.

(Continued)

*Primary Examiner* — Peter DungBa Vo
*Assistant Examiner* — Kaying Kue
(74) *Attorney, Agent, or Firm* — Morgan, Lewis & Bockius LLP

(57) ABSTRACT

The present invention is for a switchable 3-dimensional conversion device having a spacer stably formed at a predetermined height by imprinting, a manufacturing method thereof and a stereoscopic image display device using the same, the method includes: providing a first electrode on an inner surface of a first substrate; applying a resin material to the first electrode to a predetermined thickness; placing a mold structure which has a concave part formed with a predetermined depth thereon, on the resin material; stamping the resin material using the mold structure, in order to form a spacer pattern; dry etching the spacer pattern to form a spacer; forming a plurality of second electrodes, which are spaced from one another and have longitudinal axes in one direction, respectively, on a second substrate; and arranging the first and second substrates opposite to each other, bond- (Continued)

ing the same, and forming a liquid crystal layer between the first and second substrates.

17 Claims, 8 Drawing Sheets

(51) Int. Cl.
  *G02F 1/29* (2006.01)
  *G02F 1/1339* (2006.01)
(58) Field of Classification Search
  USPC .... 29/846, 848, 830, 831, 829; 345/87, 212; 216/13
  See application file for complete search history.

(56) References Cited

U.S. PATENT DOCUMENTS

| | | | | |
|---|---|---|---|---|
| 8,537,293 | B2* | 9/2013 | Van Der Horst | G02B 27/225 349/15 |
| 8,614,771 | B2* | 12/2013 | Hong | G02B 27/2214 348/59 |
| 2005/0095699 | A1* | 5/2005 | Miyauchi | B01L 3/502761 435/299.1 |
| 2007/0296896 | A1* | 12/2007 | Hong | G02B 27/2214 349/122 |
| 2008/0297594 | A1* | 12/2008 | Hiddink | H04N 13/0404 348/59 |
| 2009/0033812 | A1* | 2/2009 | Ijzerman | G02B 27/2214 349/15 |
| 2009/0153653 | A1 | 6/2009 | Lee et al. | |
| 2011/0084961 | A1* | 4/2011 | Son | G02B 27/2242 345/419 |
| 2011/0084963 | A1 | 4/2011 | Im | |
| 2012/0099034 | A1* | 4/2012 | Pijlman | G02B 27/2214 349/15 |

FOREIGN PATENT DOCUMENTS

| | | |
|---|---|---|
| EP | 1980903 A2 | 10/2008 |
| JP | 2008070448 A | 3/2008 |
| JP | 2009-204938 A | 9/2009 |
| KR | 20080048331 A | 6/2008 |
| KR | 20090006709 A | 1/2009 |
| WO | WO 2010136951 A1 * | 12/2010 ............. H04N 13/00 |

OTHER PUBLICATIONS

Office Action issued in counterpart Chinese Patent Application No. 201110179874.4 dated Sep. 26, 2013.
Office Action dated May 25, 2016 by the Korean Patent Office in counterpart Korean Application No. 10-2010-0063661.
Office Action dated Oct. 24, 2016 from the Korean Patent Office in counterpart Korean application No. 10-2010-0063661.

* cited by examiner

O₂ plasma

SWITCHABLE 3-DIMENSIONAL CONVERSION DEVICE, METHOD FOR MANUFACTURING THE SAME AND STEREOSCOPIC IMAGE DISPLAY DEVICE USING THE SAME

This application claims the benefit of Korean Patent Application No. 10-2010-0063661, filed on Jul. 2, 2010, which is hereby incorporated by reference as if fully set forth herein.

BACKGROUND OF THE INVENTION

Field of the Invention

The present invention relates to a stereoscopic image display device and, more particularly, to a switchable 3-dimensional conversion device having a spacer stably formed at a predetermined height by imprinting, a manufacturing method thereof and a stereoscopic image display device having the same.

Discussion of the Related Art

Services for rapidly providing information over a high speed communication network have been developed from 'listening and speaking' services, such as provided by a telephone, to 'viewing and listening' multimedia type services using a digital terminal for rapidly processing text, voice and image data and, ultimately, to a three-dimensional stereoscopic information communication service for providing realistic stereoscopic viewing and entertainment, in order to '3-dimensionally viewing and enjoying above time and space'.

In general, the eyes form a three dimensional image based upon the principle of stereovision. Since two eyes have a disparity therebetween, that is, since two eyes are separated from each other by about 65 mm, the left eye and the right eye view slightly different images. A difference between images caused by such difference between the positions of the two eyes is referred to as 'binocular disparity'. A three-dimensional image display device enables the left eye to view only an image for the left eye and the right eye to view only an image for the right eye according to such binocular disparity.

That is, the left and right eyes view two different two-dimensional images. Once these images are received by the retina and sent to the brain, they are processed into a three dimensional image by the brain, providing a sense of depth to the viewer. This capability is generally referred to as 'stereography' and a device having this capability is referred to as a stereoscopic image display device.

Meanwhile, stereoscopic display devices may be classified according to the components used to implement 3-dimensional (3D) display. For instance, a device using a liquid crystal layer, which can alter the path of light and induce a different in light path in a manner substantially equal to that of a lens, is referred to as an electrically-driven liquid crystal lens type device.

In general, a liquid crystal display device includes two opposing electrodes with a liquid crystal layer interposed therebetween. Applying voltage to the foregoing electrodes may generate an electric field to drive liquid crystal molecules in the liquid crystal layer. The liquid crystal molecules have polarity and optical anisotropy. Polarity means that the liquid crystal molecules have different charges, which move to respective ends thereof and are oriented in specific directions (polarized) when placed in an electric field, thereby allowing modification in molecular arrangement depending upon an applied electric field. On the other hand, optical anisotropy means that a path of light or polarization thereof is varied depending upon angle of incidence of light or polarization of the same, on the basis of an elongated and narrow structure of a liquid crystal molecule as well as the foregoing orientation for molecular arrangement.

As a result, the liquid crystal layer has a difference in transmittance due to voltage applied to two electrodes and may display images by altering the difference in respects to pixels.

In recent years, an electrically-driven liquid crystal lens having a liquid crystal layer functioning as a lens based on characteristics of liquid crystal molecules has been proposed.

Specifically, the lens utilizes a difference in refractive indexes between a lens material and air to control an incident light path per location basis on the lens. Applying different voltages to the liquid crystal layer depending upon different parts of electrodes in order to form an electric field, the liquid crystal layer may be driven and the incident light entering into the liquid crystal layer may sense phase changes on different sites of incidence to the liquid crystal layer. As a result, the liquid crystal layer may control the path of the incident light, like an actual lens.

The following description will be given to explain an electrically-driven liquid crystal lens typically used in the art.

FIG. 1 is a cross-sectional view illustrating an electrically-driven crystal lens of related art, and FIG. 2 is a schematic view illustrating a lens formed by the electrically-driven liquid crystal lens of related art.

Referring to FIG. 1, the electrically-driven liquid crystal lens of related art consists of first and second substrates 10 and 20 arranged opposite to each other, and a liquid crystal layer 30 interposed between the first and second substrates 10 and 20.

In this case, the first substrate 10 has first electrodes 11 at a first interval and a distance between adjacent first electrodes 11 is referred to as 'pitch.' The first electrodes are formed by repeating the same patterns at a cycle of the pitch.

The second substrate 20, provided opposite the first substrate 10, may have a second electrode 21 throughout an inner surface thereof.

Here, since liquid crystal molecules in the liquid crystal layer 30 act on the basis of the strength and distribution of the electric field, the molecules follow a parabolic potential profile thus having a phase distribution similar to an electrically-driven liquid crystal lens shown in FIG. 2.

In order to maintain a predetermined gap between the first and second substrates 10 and 20, ball spacers 40 are provided. The ball spacers 40 are randomly dispersed on either of the substrates and freely move about the surface of the substrate, that is, are not fixed to a given position.

Such an electrically-driven liquid crystal lens of related art is fabricated under specific conditions in that high voltage is applied to the first electrode 11 and the second electrode 12 is grounded. These voltage conditions cause the electric field strength to peak at the center of the first electrode 11 while decreasing with increasing distance from the first electrode 11. Accordingly, when the liquid crystal molecules forming the liquid crystal layer 30 have positive dielectric anisotropy, these molecules are arranged along the vertical field, which in turn stand upright at the center of the first electrode 11 while being inclined toward a horizontal line with increasing distance from the first electrode.

Therefore, in view of light transmission as shown in FIG. 2, the light path is short at the center of the first electrode 11 and is extended with increasing distance from the first electrode 11. Illustrating this condition based upon phase patterns, light transmission effects similar to a lens having a parabolic surface may be obtained.

In this regard, the first electrode 11 and the second electrode 21 cause behavior of a liquid crystal electric field and induce a light refractive index to meet a parabolic spatial function mode. The first electrode 11 also corresponds to a corner part (edge area) of the lens.

Here, since the first electrode 11 receives a slightly higher voltage than that applied to the second electrode 21, a potential difference is generated between the first and second electrodes 11 and 21 as shown in FIG. 2, thus causing a sharply inclined field on the first electrode 11. Therefore, the liquid crystal does not have a smooth distribution but is slightly distorted, thus not having a parabolic type refractive index distribution or being very sensitive to applied voltage.

An electrically-driven liquid crystal lens of related art as described above has the following problems.

An electrically-driven liquid crystal lens of related art may be formed by forming liquid crystals and electrodes on both substrates arranged at opposite sides of the liquid crystals and applying voltage to the electrodes, eliminating the need for a lens having a parabolic surface.

In order to stably maintain a cell gap of a liquid crystal layer placed between both the substrates, ball spacers are dispersed therebetween. However, the liquid crystals do not act at specific positions where these spacers are present, thus neither embodying lens effects nor displaying images due to being obscured by the ball spacers. Otherwise, the ball spacers may induce light scattering, in turn generating crosstalk in the 3D display.

In addition, other problems including, for example, reflection at sites where the ball spacers are present, faults such as rain effects caused when the ball spacers move in the liquid crystal field lens due to fluidity (that is, mobility) of the ball spacers, or the like, may be encountered.

Moreover, when the cell gap is increased to increase a height of the electrically-driven liquid crystal lens, each ball spacer must have a correspondingly large diameter. However, an increase in the diameter of the ball spacer may result in an increase in overall volume of the ball spacer. As a result, not only top and bottom areas but also left and right areas hidden by the ball spacer may be enlarged. Briefly, if the ball spacer has increased diameter, an area of the lens hidden by the ball spacer may be increased, thus reducing an aperture ratio. Furthermore, there is a need for novel materials to fabricate a ball spacer with increased diameter.

SUMMARY OF THE INVENTION

The present invention is directed to solving the foregoing problems and an object of the present invention is to provide a switchable 3D conversion device having a spacer stably formed at a predetermined height by imprinting, a method for manufacturing the same, and a stereoscopic image display device having the same.

In order to accomplish the foregoing goal of the present invention, there is provided a method for fabrication of a switchable 3D conversion device, including: providing a first electrode on an inner surface of a first substrate; applying a resin material on the first electrode to a predetermined thickness; placing a mold structure that has an uneven (concave) part formed to a predetermined depth thereon, on the resin material; stamping the resin material using the mold structure, in order to form a spacer pattern; dry etching the spacer pattern to form a spacer; forming a plurality of second electrodes, which are spaced from one another and have longitudinal axes in one direction, respectively, on a second substrate; and arranging the first and second substrates opposite to each other, bonding the same, and forming a liquid crystal layer between the first and second substrates.

The depth of the concave part in the mold structure may correspond to a height of the spacer.

Here, the spacer pattern may include a resin material having a predetermined shape and filling the concave part, as well as the residue remaining around the resin material. In this case, formation of the spacer by dry etching the spacer pattern may include cutting a front side of the spacer pattern to a predetermined thickness, so as to remove the residue.

During dry etching, oxygen plasma is preferably applied.

After applying a mold resin to a back plane, the coated back plane is positioned to face a master mold having a convex part, enabling formation of the concave part corresponding to the convex part.

The depth of the concave part in the mold structure may range from 10 to 30 µm.

The resin material used herein may be a photocurable polymer precursor and the photocurable polymer precursor may contain a crosslinking agent.

Using the mold structure to stamp the resin material, a spacer pattern may be formed. The inventive method may further include light irradiation at an outer surface of the first substrate to harden the spacer pattern.

A switchable 3D conversion device fabricated by the above method in order to accomplish the foregoing purpose may have a first voltage source to apply a voltage to the second electrodes, after dividing the second substrate at predetermined pitches, wherein the voltage increases from the center of a pitch to an edge thereof. Otherwise, the switchable 3D conversion device may have a first voltage source to apply different first and second voltages simultaneously to a plurality of second electrodes placed in both an area and the other area, respectively, after dividing the second substrate at predetermined pitches and separating the former area from the remaining area in each of the pitches.

In such case, the first electrode may have a second voltage source to apply ground voltage or threshold voltage to the first electrode.

In order to accomplish the foregoing purpose, there is also provided a stereoscopic display device including: the switchable 3D conversion device fabricated by the above method; a first voltage source to apply a voltage to a plurality of second electrodes, after dividing the second substrate at predetermined pitches, wherein the voltage increases from the center of a pitch to an edge thereof; and a second voltage source to apply ground voltage or threshold voltage to the first electrode; and a display panel combined with the switchable 3D conversion device to display images.

In place of the foregoing first voltage source, this stereoscopic image display device may have an alternative first voltage source to apply first and second voltages simultaneously to the second electrodes placed in both an area and the other area, respectively, after dividing the second substrate at predetermined pitches and separating the former area from the remaining area in each of the pitches.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
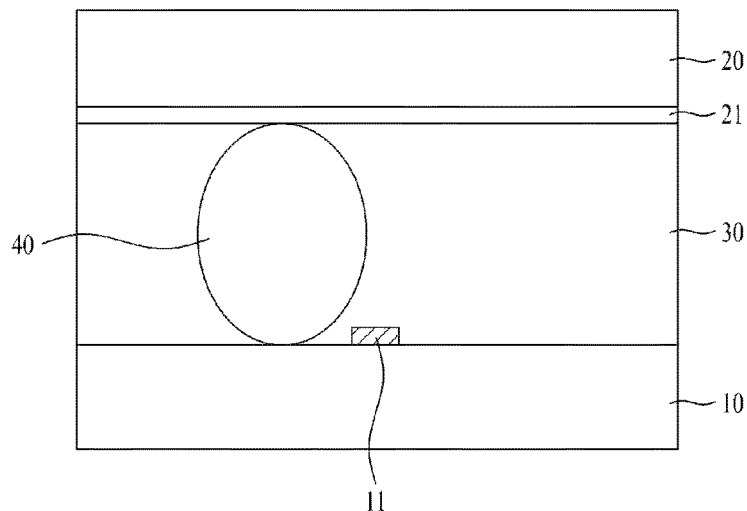
FIG. 1 is a cross-sectional view illustrating an electrically-driven liquid crystal lens of related art.
Figure 2:
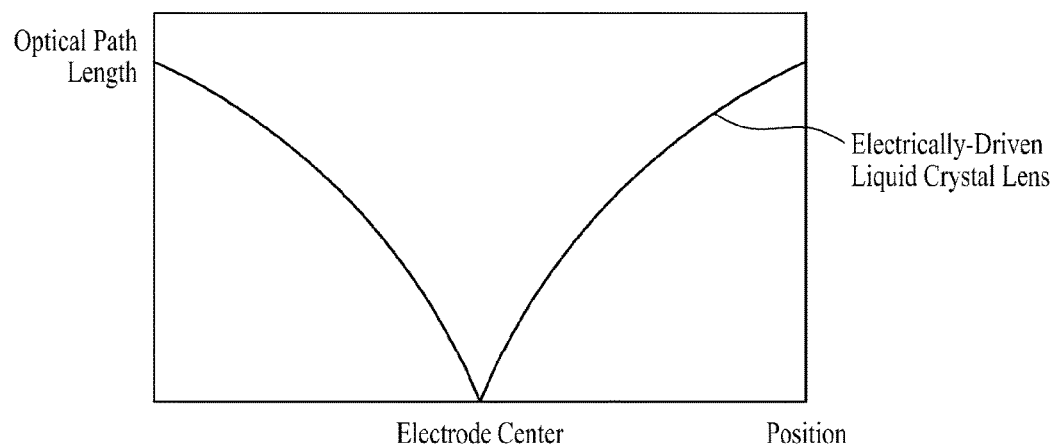
FIG. 2 is a schematic view illustrating a lens form embodied into the electrically-driven liquid crystal lens of related art.

First, a preferred embodiment of a switchable 3D conversion device according to the present invention will be described in detail.

Herein, a switchable 3D conversion device means a device that directly outputs basic 2D image signals based on whether or not voltage is applied and, otherwise, converts the 2D image signals into 3D image signals and then outputs the same.

The switchable 3D conversion device may include, for example, an electrically-driven liquid crystal lens type device and a barrier type device.

Here, the electrically-driven liquid crystal lens type device may employ a refractive index of the liquid crystal, so as to have a light path like a lens.

On the other hand, the barrier type device may apply voltage within a predetermined pitch, which in turn partitions the pitch into a black region and the remaining white region and drives the same, thus enabling the white region to embody slit-like effects.

Respective examples of the electrically-driven liquid crystal lens type device and the barrier type device will be introduced in the following description in conjunction with the accompanying drawings.

Meanwhile, in order to solve problems associated with an electrically-driven liquid crystal lens of related art using the ball spacers described above to maintain a predetermined thickness of the liquid crystal layer, the ball spacers need to be replaced with column spacers, as proposed by the present invention.

However, the thickness of the liquid crystal layer in the foregoing electrically-driven liquid crystal lens should be at least a predetermined value, that is, requires a range of 10 to 30 μm, in order to achieve a light path difference comparable to that of the lens. Such a thickness is at least 4 times that of a liquid crystal layer used in a conventional liquid crystal display device. For this reason, a column spacer to be formed must have an increased height. The column spacer having such a height cannot be fabricated unless a raw material for the column spacer is subjected to exposure and development to maintain the foregoing thickness during a general photolithography process. However, in order to form a column spacer having a thickness 4 times that of the column spacer used in the liquid crystal display device, a time consuming exposure and development process is required and, under general conditions, the exposure and development may not be sufficiently conducted throughout the thickness, thus causing pattern failures. Therefore, there are difficulties in fabricating a spacer for an electrically-driven liquid crystal lens through an exposure process.

In particular, a focal length of the electrically-driven liquid crystal lens is inversely proportional to Δnd. Therefore, as to manufacture an electrically-driven liquid crystal lens with a shorter focal length, Δnd must be extended. However, Δn represents a difference in refractive index of liquid crystals ('ne–no') and, once the liquid crystal to be used is determined, it is difficult to change the above value, that is, Δn. Instead, a method of controlling Δnd by regulating 'd' (the thickness of the liquid crystal layer) has been proposed. However, in order to support a liquid crystal layer having a relatively large thickness, a spacer having a relatively large height is required. Therefore, in consideration of yield of electrically-driven liquid crystal lens, it is necessary to continuously fabricate a spacer having at least a predetermined height.

Hereinafter, the following description will be given to concretely explain preferred embodiments of a switchable 3D conversion device, a method for fabrication thereof and a stereoscopic image display device using the same according to the present invention.

Figure 3:
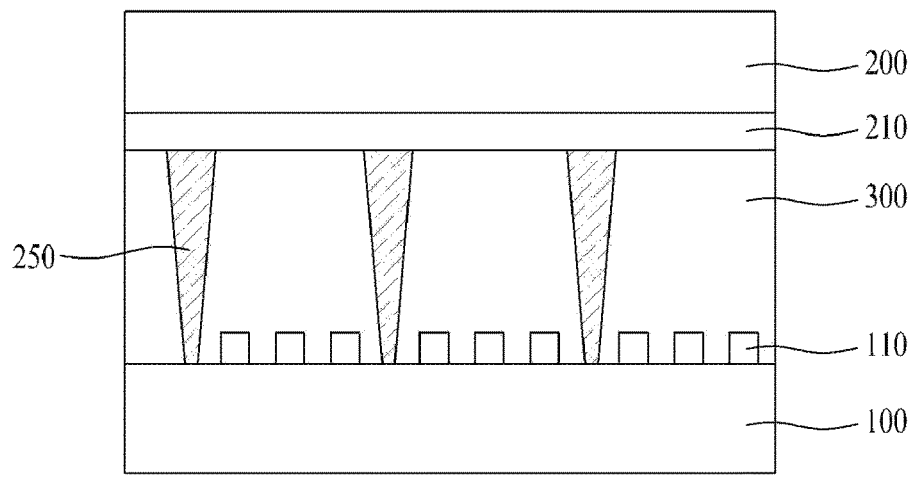
FIG. 3 is a cross-sectional view illustrating a switchable 3D conversion device according to an exemplary embodiment of the present invention.

FIG. 3 is a cross-sectional view illustrating a switchable 3D conversion device according to an exemplary embodiment of the present invention.

Referring to FIG. 3, the inventive switchable 3D conversion device comprises: first and second substrates 200 and 100 arranged opposite each other; a first electrode 210 provided throughout an inner surface of the first substrate 200; a column spacer 250 provided on top of the first electrode 210, which is formed by photo-hardening a photocurable precursor; a plurality of second electrodes 110 spaced from one another, which are provided on the second substrate 100; and a liquid crystal layer 300 formed between the first and second substrates 200 and 100.

In this regard, the column spacer has a thickness ranging from, for example, 10 to 30 μm, which is 4 to 10-times that of a spacer used in a typical display device such as a liquid crystal display. For this purpose, the column spacer 250 may be fabricated using a mold structure in an imprinting process to conduct patterning. That is, problems such as increased processing time and pattern failures, which occur when a spacer having a predetermined height is formed by a method of fabricating a spacer during conventional exposure and development, were preferably overcome.

Optionally, if a height of a lens is set to be high when the inventive switchable 3D conversion device is used as an electrically-driven liquid crystal lens, the column spacer 250 may have a thickness of more than 30 μm. Furthermore, the column spacer 250 may be formed to correspond to a location where crosstalk occurs, among sites on which the liquid crystal lens is formed, otherwise, to correspond to a location on which a black matrix layer of a bottom display panel is provided. As shown in this figure, the column spacer 250 was formed to correspond to an edge part of the electrically-driven liquid crystal lens which was fabricated using the inventive switchable 3D conversion device.

If the switchable 3D conversion device in a barrier form is used, the column spacer 250 may be located at a boundary between a black region and a white region. Otherwise, the column spacer 250 may be located at a site corresponding to a position at which a black matrix layer is formed.

The following description will be given to explain a process of fabricating the column spacer 250.

FIGS. 4A through 4D are cross-sectional views illustrating a process of fabricating a switchable 3D conversion device according to an exemplary embodiment of the present invention.

Figure 4A:
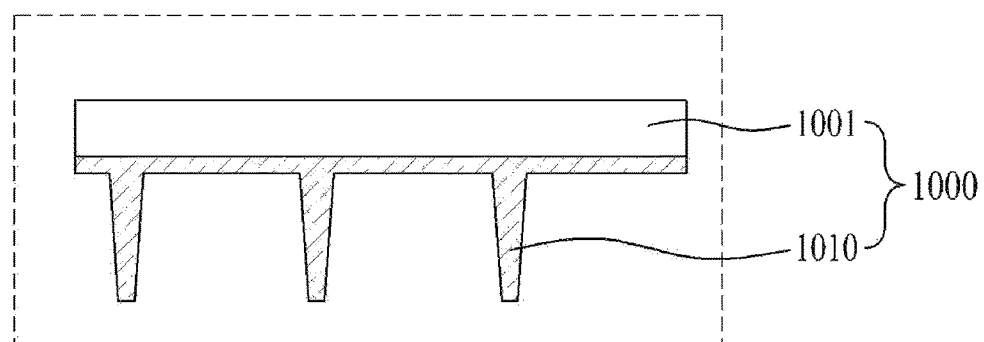
FIGS. 4A through 4D are cross-sectional views illustrating a process of fabricating the switchable 3D conversion device according to an exemplary embodiment of the present invention.
Figure 4A:
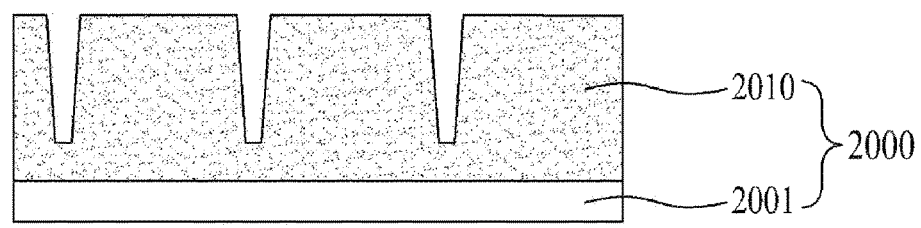

Referring to FIG. 4A, after applying a mold resin 2010 to a back plane 2001 to a predetermined thickness, the back plane 2001 coated with the mold resin is subjected to stamping in a master mold 1000, which has a base substrate 1001 having a convex patterned part, thus allowing the mold resin 2010 to have a concave patterned part corresponding to the convex patterned part. As a result, a mold structure 2000 is obtained.

Here, the base substrate 1001 of the master mold 1000 or the back plane 2001 of the mold structure 2000 may be a flat substrate such as a sheet of glass.

Figure 4B:
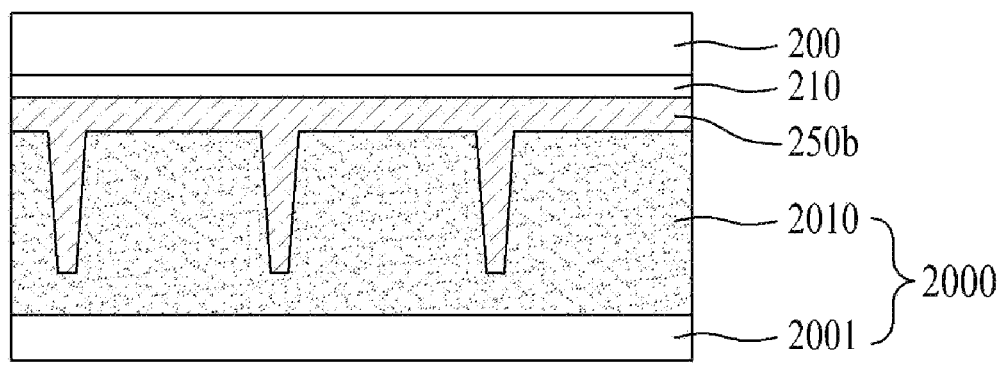

Referring to FIG. 4B, a first substrate 200 used as a panel of the switchable 3D conversion device is prepared and a first electrode 210 is provided throughout an inner surface of the first substrate 200.

Then, a resin material 250b is applied on the first electrode 210 to a predetermined thickness.

Here, the resin material 250b may be a photocurable polymer precursor and may include, for example, a photoinitiator, various functional monomers, a crosslinking agent, a wetting agent, a thermal stabilizer, an adhesive, and the like. Such a photocurable polymer may be applied in a liquid state on the first electrode 210.

Next, after placing the mold structure 2000 having the concave part with a predetermined depth on the resin material 250b, the resin material 250b is subjected to stamping so as to form a spacer pattern 250b.

Here, the concave part has a depth corresponding to a height of the space, for example, ranging from 10 to 30 µm. Optionally, the depth of the concave part may exceed this upper limit.

Due to a weight of the mold structure 2000 or the first substrate 200, as well as capillary action between the concave part of the mold structure 2000 and the resin material 250b, the resin material 250b is permeated into the concave part.

Figure 4C:
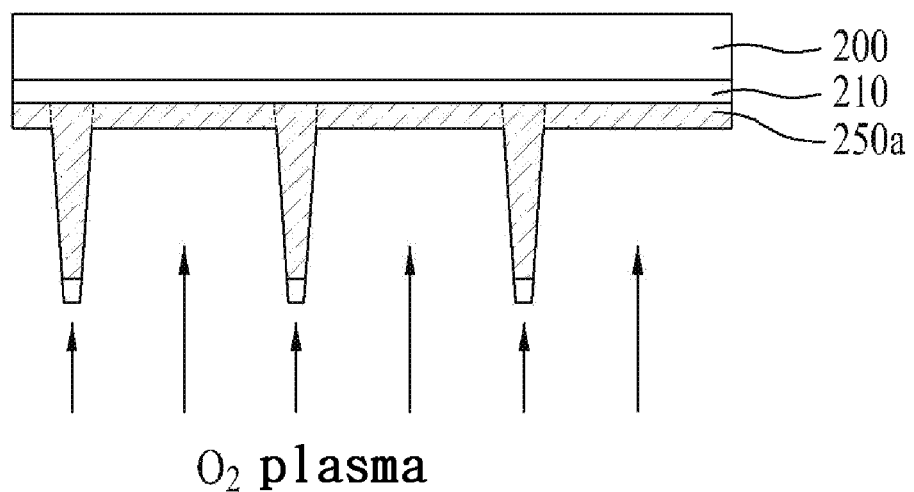

As shown in these figures, the first substrate 200 may be provided on top of the mold structure 2000, followed by stamping. Otherwise, the mold structure 2000 may be placed above the first substrate 200 and subjected to stamping. In either case, a spacer pattern 250a may be formed using the weight of the mold structure or the first substrate as well as the capillary action between the resin material and the concave part, as shown in FIG. 4C. The spacer pattern 250a may include the resin material filled in the concave part of the mold structure and the residue around the resin material.

In this regard, the spacer pattern 250a is obtained by shaping the resin material 250b to a predetermined depth through capillary action and hardening the shaped resin. Briefly, after stamping the resin material using the mold structure 2000, the resin material 250b is hardened by irradiating light from an outer surface of the first substrate while the mold structure 2000 is not separated from (that is, in contact with) the resin material 250b. As a result, the spacer pattern 250a is formed.

Figure 4D:
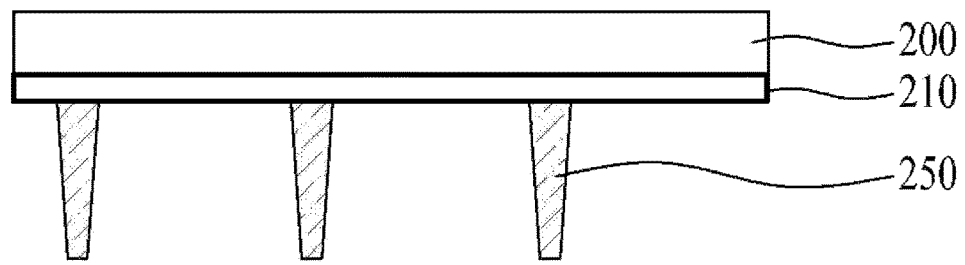

Next, the spacer pattern 250a is subjected to dry etching, so as to produce a spacer 250 as shown in FIG. 4D.

Such dry etching may be conducted by $O_2$ plasma treatment of a surface of the spacer pattern 250a. Similar to an asking process, dry etching the spacer pattern to form the spacer also serves to burn off residue and may reduce the overall spacer pattern to a predetermined thickness.

As such, when the spacer 250 is fabricated, the spacer pattern is formed by a stamping process of the mold structure 200 and a photo-hardening process. The photocurable polymer precursor does not require exposure and development processes employed in typical photolithography. Therefore, contrary to a normal photoresist, a development promoter is not contained in the foregoing polymer precursor.

Referring to FIG. 3, after preparing a second substrate 100, a plurality of second electrodes 110, each having a longitudinal axis in one direction (i.e., in this figure, a longitudinal axis in a direction of going through the ground), are provided on top of the second substrate 100.

Then, a seal pattern (not shown) is formed on either of the first substrate 200 and the second substrate 100, through dry etching of the spacer pattern, followed by arranging both the substrates 200 and 100 opposite to each other and bonding the same. A liquid crystal layer 300 is formed between the first and second substrates 200 and 100.

Δn (a difference in anisotropic refractive index) of liquid crystal molecules in the liquid crystal layer 300 ranges from 0.2 to 0.3, which is substantially above a difference in anisotropic refractive index (less than 0.1) of a liquid crystal layer applied to a typical liquid crystal panel.

Formation of the liquid crystal layer 300 is performed by combining the first and second substrates 200 and 100 then injecting liquid crystal into an inlet, or, by dropping the liquid crystal on either substrate then sandwiching the first and second substrates 200 and 100.

Figure 5:
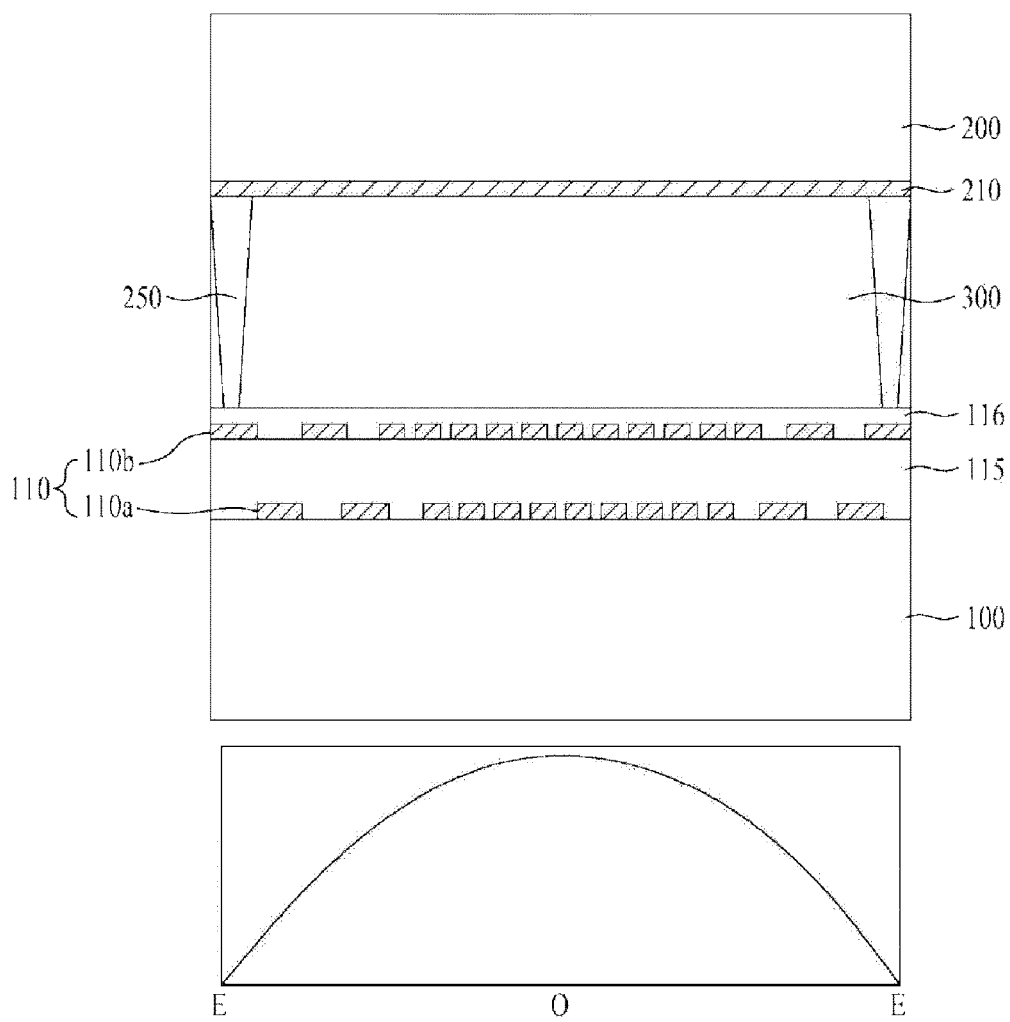
FIG. 5 is a cross-sectional view illustrating an electrically-driven liquid crystal lens embodied using the inventive switchable 3D conversion device.

FIG. 5 is a cross-sectional view illustrating an electrically-driven liquid crystal lens embodied using the inventive switchable 3D conversion device.

Referring to FIG. 5, the switchable 3D conversion device is embodied into a liquid crystal electrode lens. Compared to the structure shown in FIG. 3, second electrodes 110, 110a and 110b are separately provided on different layers by interposing a first insulating film 115 therebetween (that is, a first layer of second electrodes 110a is formed on an second electrode 100 and a second layer of second electrodes 110b is formed above the first insulating film 115) and, in addition, there is a gap between adjacent electrodes in each layer gradually increasing from the center 'O' to an edge 'E' of the layer.

The part shown in the same figure is only a region of a lens. A column spacer 250 is formed to correspond to an edge part of this lens region. A second insulating film 116 is further provided to cover a top of the second electrode 110b in the second layer. In this case, the second insulating film 116 may be omitted.

However, a structure of the liquid crystal is not particularly limited to the foregoing two-stage structure and may instead have a simple structure shown in FIG. 3 so as to function through control of applied voltage.

For instance, increasing voltage applied to a plurality of second electrodes 110 placed from the center to the edge of the lens region while applying a ground voltage or a threshold voltage to the first electrode 210, a vertical field may be varied and controlled on a per region basis. That is, allowing the vertical field to be substantially absent at the center while maximally applying the vertical field to the edge of the lens, the vertical field may gradually increase from the center to the edge of the lens.

Regarding to a lens region L, the shape shown in FIG. 5 is a width of the lens region L corresponding to one pitch P and the lens region L is formed in a horizontal (or crosswise) direction at a cycle of the pitch P.

The following will briefly describe a method for selectively conducting two-dimensional image display or three-dimensional image display, using the foregoing electrically-driven liquid crystal lens.

Figure 6A:
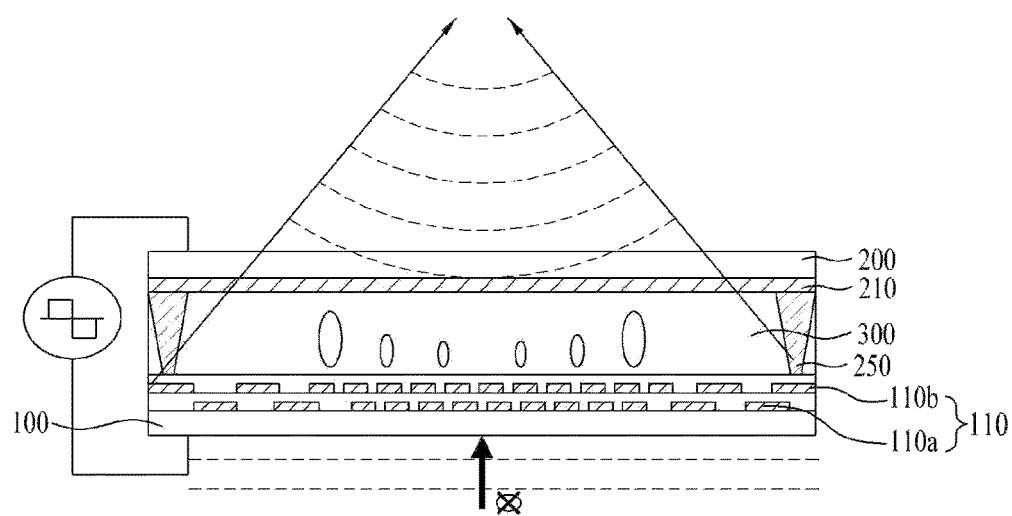
FIGS. 6A and 6B show a potential profile and an orientation of liquid crystals when the inventive electrically-driven liquid crystal lens is on/off.
Figure 6B:
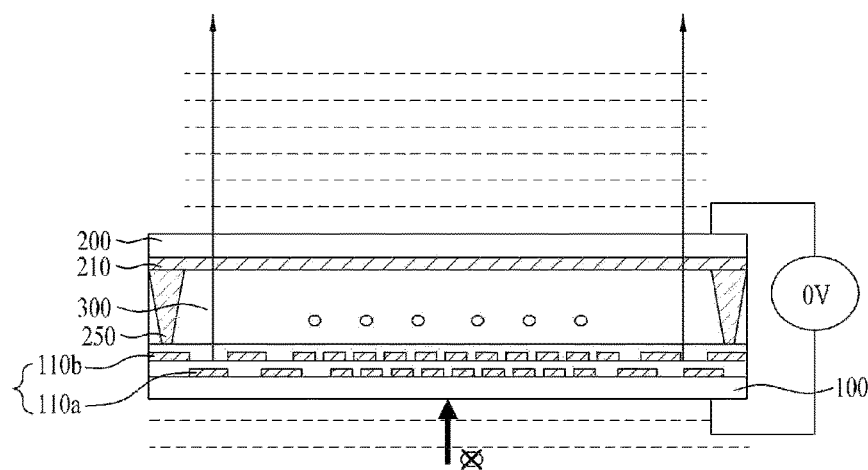

FIGS. 6A and 6B illustrate a potential profile and an orientation of liquid crystals when the inventive electrically-driven liquid crystal lens is on/off.

In particular, FIG. 6A shows three-dimensional display when the electrically-driven liquid crystal lens is on. Similar to the electrically-driven liquid crystal lens driven as shown in FIG. 5, if an electrically-driven liquid crystal lens having a parabolic shape to correspond to the lens region is fabricated, a first voltage $V_0$ approximately equal to a threshold voltage or ground voltage is applied to the center of the lens region while the largest 'n' voltage $V_{max}$ is applied to the second electrode 110 placed at the edge of the lens region. In this regard, voltage applied to a plurality of second electrodes 110 located between the center of the lens region and the edge thereof gradually increases between the first voltage $V_0$ and the 'n' voltage $V_{max}$, away from the center of the lens region. When the voltage is applied to a plurality of second electrodes 110, the first electrode 210 receives a different voltage such as a ground voltage or a threshold voltage, thereby forming a vertical field between the plural second electrodes 110.

For this purpose, the electrically-driven liquid crystal lens may have a first voltage source (not shown) to apply voltage ranging from the first voltage $V_0$ to the 'n' voltage $V_{max}$ to the second electrodes 110, as well as a second voltage source (not shown) to apply the ground voltage or the threshold voltage to the first electrode 210.

The plural second electrodes 110 are symmetrically arranged at left and right sides in respect to a center part of the lens region. To such second electrodes 110 from the center part to both edge parts, corresponding voltages ($V_0$, $V_1$, $V_2$, ... $V_{max}$) are applied through the voltage source on a pad part (corresponding to a non-display part of the display panel).

Here, the minimum threshold voltage $V_0$ applied to the second electrode 110 is an alternating square wave and such a threshold voltage $V_0$ is calculated by an equation of:

$$\pi\sqrt{\frac{K1}{\Delta\varepsilon\varepsilon 0}}$$

(wherein $\Delta\varepsilon$ is liquid crystal dielectric anisotropy, K1 is the elastic modulus of the liquid crystal and $\varepsilon_0$ is the dielectric constant of free space). Furthermore, the highest voltage among voltages applied to a plurality of second electrodes 110 in response to the edge of the lens region is an applied alternating square wave having a peak value higher than a peak value of threshold voltage.

The foregoing electrically driven liquid crystal lens induces a light path difference per lens region basis, thereby exhibiting behavior similar to a parabolic lens, so as to convert two-dimensional images output through the display panel (not shown) below the lens into three-dimensional images in turn outputting the converted image.

FIG. 6B shows a two-dimensional image directly output through the display panel (not shown) below the lens when the electrically-driven liquid crystal lens is off.

Here, the first electrode 210 and the second electrodes 110 are all off.

Figure 7:
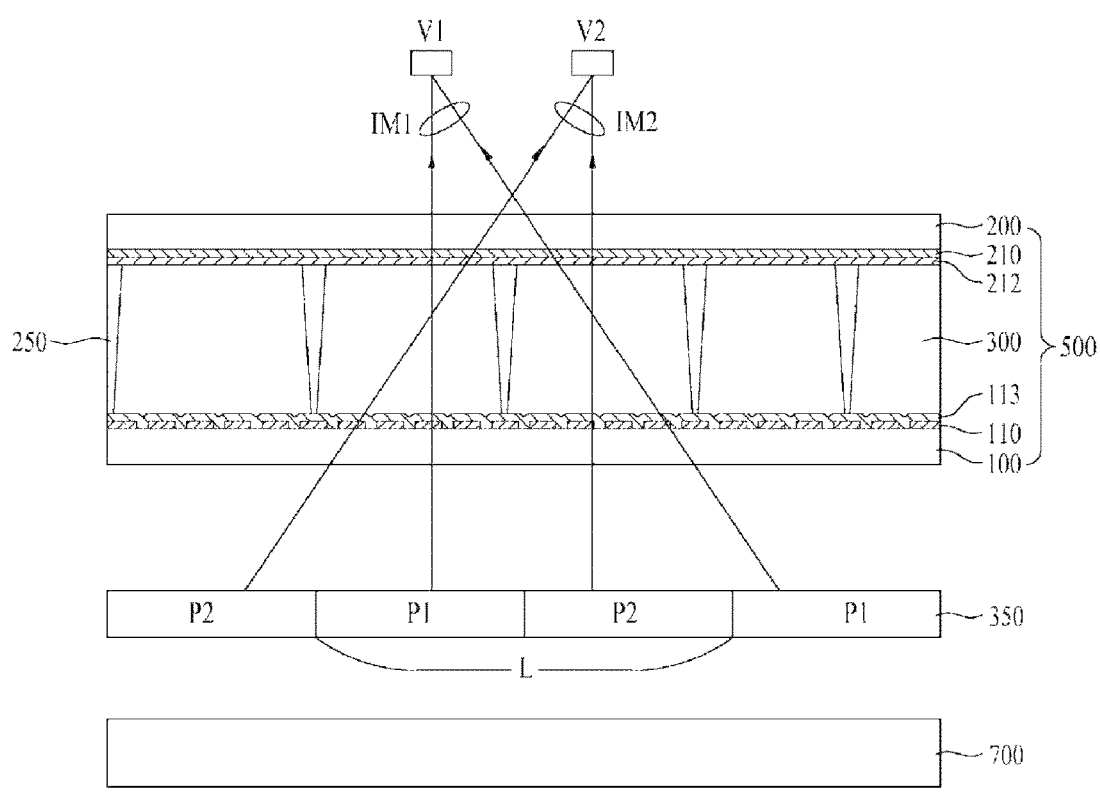
FIG. 7 is a cross-sectional view illustrating a stereoscopic image display device employing the inventive electrically-driven liquid crystal lens according to an exemplary embodiment.

FIG. 7 is a cross-sectional view illustrating a stereoscopic image display device having the inventive electrically-driven liquid crystal lens.

Referring to FIG. 7, the stereoscopic image display device having the inventive electrically-driven liquid crystal lens 500, comprises: the electrically-driven liquid crystal lens 500 having a lens function, which is driven by the applied voltage illustrated in FIGS. 3 through 5; a display panel 350 located below the electrically-driven liquid crystal lens 500, in order to output two-dimensional image information; and a light source 700 to transmit light toward the bottom of the display panel 350.

Optionally, if the display panel 350 is a self-emitting display panel to directly irradiate light, the light source 700 may be omitted.

The display panel 350 has first and second image pixels P1 and P2, which display first and second images IM1 and IM2, respectively, repeatedly arranged in sequential order. Such a display panel 350 may include, for example, a liquid crystal display device (LCD), an organic light emitting display device (OLED), a plasma display panel (PDP), a field emission display device (FED), a flat display panel such as an electrophoretic display panel, and the like. The display panel 350 is located below the electrically-driven liquid crystal lens 500 and transfers 2D image signals thereto.

The inventive electrically-driven liquid crystal lens functions to output the 2D image signals along a profile of the lens face, so as allow the signals to be converted into 3D image signals. The inventive lens is placed on the display panel 350 in 2D mode to selectively output 3D image signals, otherwise, directly outputting 2D image signals, depending upon whether or not voltage is applied. Briefly, since light passes through the lens if there is no applied voltage, utilizing such characteristics may enable the lens to have combined switching functions such that the lens may operate in 2D mode when voltage is not applied, while displaying 3D images when voltage is applied.

FIG. 7 also illustrates first and second orientation films 212 and 113 to cover the first electrode 210 and the second electrode 110, respectively. Such first and second orientation films may be formed or omitted depending upon a driving mode of the liquid crystal layer 300. In this regard, a rubbing direction of the first and second orientation films may be parallel to a longitudinal axis of the second electrode 111 or may extend across the same.

The above description was given to explain an example of the switchable 3D conversion device according to the exemplary embodiment of the present invention embodied into an electrically-driven liquid crystal lens. Hereinafter, another example of the inventive switchable 3D conversion device in a barrier form will be described in detail.

Figure 8:
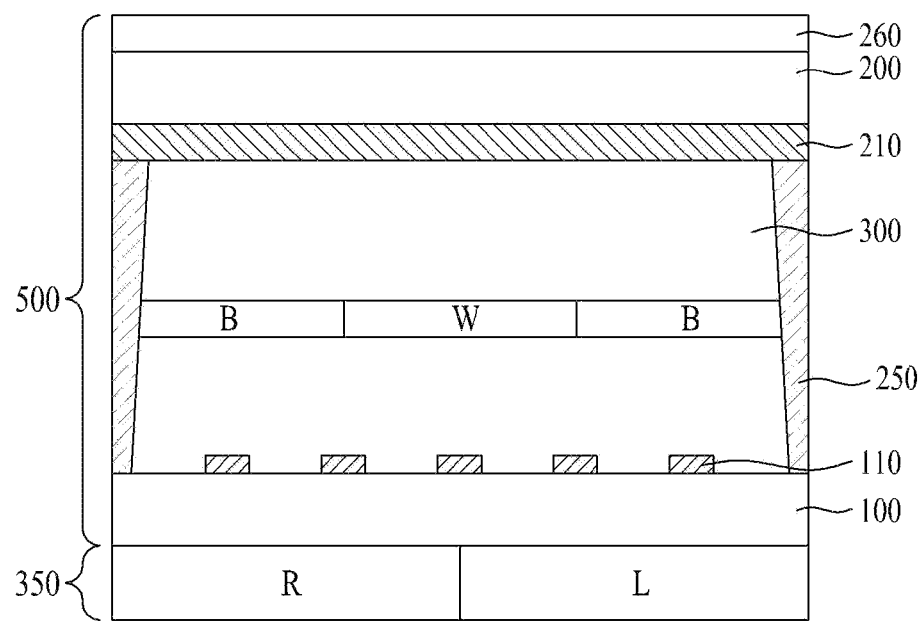
FIG. 8 is a cross-sectional view illustrating a switchable 3D conversion device in a barrier form according to an exemplary embodiment of the present invention.

FIG. 8 is a cross-sectional view illustrating a switchable 3D conversion device in a barrier form according to an exemplary embodiment of the present invention.

As shown in FIG. 8, if the switchable 3D conversion device is embodied in a barrier form, the switchable 3D conversion device has a first voltage source to apply different first and second voltages to a plurality of second electrodes present on an area and the other area divided from the former, wherein the former is partitioned from the remaining area within a pitch corresponding to the lens region.

In this regard, when voltage is applied through the first voltage source, the pitch of the switchable 3D conversion device is divided into a black region (B) and a white region (W).

In other words, when the switchable 3D conversion device is in a normal white mode, the black region applies a relatively high voltage to the second electrodes 110 while the white region applies a lower voltage thereto. Here, the lower voltage is already applied to the first electrode 210, whereas the black region only has a vertical field applied thereto.

Only when the voltage is applied, binocular disparity may be induced by converting a part of the pitch into the black region B and using the other part, which remained as the white region W, as a slit. In order to completely obscure the black region W, a polarizer 260 having an absorption axis in a direction of the liquid crystal orientation when applying voltage may be further provided at the outer surface of the first substrate 200.

With regard to the barrier mode described above, the first and second electrodes 210 and 110 should be off during 2D display, so as to directly output images of the bottom display panel 350.

As such, a switchable 3D conversion device, a manufacturing method thereof and a stereoscopic image display device according to the present invention may enable formation of a column spacer to at least a predetermined height in a short time by imprinting, thereby freely controlling a height of a liquid crystal layer in the switchable 3D conversion device. As a result, increased freedom in cell gap formation may be achieved, especially, for a structure requiring increase in Δnd, for example, an electrically-driven liquid crystal lens, beneficial features such as stability and easy formation of patterns may be attained, thus expecting increase in yield.

The switchable 3D conversion device, the method for fabrication thereof and the stereoscopic image display device using the same according to the foregoing description have the following effects.

First, a mold structure having a concave part may correspond to a resin material by imprinting, so as to form a column spacer that has a height corresponding to a depth of the concave part. Accordingly, if the depth of the concave part ranges from 10 to 30 μm, it is possible to form an electrically-driven liquid crystal lens and/or a spacer of a switchable 3D conversion device in a switchable barrier form, with a desired height sufficiently corresponding to a cell gap of a liquid crystal layer. Briefly, when forming a spacer to a predetermined height in photolithography process, a long time is not required or faults during exposure and/or development may be prevented.

In contrast to a typical ball spacer method, the present invention may provide a flat area, thus effectively reducing an obscured area. Also, as compared to the ball spacer matter, the obscured area may be regularly formed, and therefore, the switchable 3D conversion device of the present invention can intentionally obscure regions where cross-talk occurs by suitably arranging the column spacers. Consequently, the present invention may secure enhanced image quality.

The present invention is not restricted to the exemplary embodiments and the accompanying drawings described above, and those skilled in the art will appreciate that the present invention may cover substitutions, variations and/or modifications thereof without departing from the scope of the invention defined in the appended claims.

What is claimed is:

1. A method for manufacturing a switchable 3D conversion device, comprising:
   providing a first electrode on an inner surface of a first substrate;
   applying a resin material on the first electrode to a predetermined thickness;
   placing a mold structure, which has a plurality of concave parts formed with a predetermined depth therein, on the resin material;
   stamping the resin material using the mold structure, in order to form a spacer pattern;
   dry etching the stamped spacer pattern to form a plurality of spacers so that a front side of the spacer pattern is cut to a predetermined thickness sufficient to remove the resin material remaining between the plurality of spacers, wherein the first electrode is exposed between the plurality of spacers and the plurality of spacers are spaced from one another after dry etching;
   forming a plurality of second electrodes, which are spaced from one another and have longitudinal axes in one direction, respectively, on a second substrate, wherein the second electrodes include a first group and a second group that are separately provided on different layers by an interposing film therebetween; and
   arranging the first and second substrates opposite to each other, forming a liquid crystal layer between the first and second substrates and bonding the first and second substrates,
   wherein gaps between adjacent second electrodes in each of the different layers increase from a center to edges of a lens region; and
   wherein the first electrode is exposed between the plurality of spacers after dry etching such that the liquid crystal layer directly contacts the first electrode between the plurality of spacers after the liquid crystal layer is formed between the first and second substrates.

2. The method according to claim 1, wherein the spacer pattern includes a resin material having a predetermined shape filling the concave part, and residue remaining around the resin material.

3. The method according to claim 1, wherein oxygen plasma is applied during the dry etching.

4. The method according to claim 1, wherein the mold structure is fabricated by applying a mold resin to a back plane to a predetermined thickness, and facing a master mold having a convex part to the coated back plane to enable formation of the concave part corresponding to the convex part.

5. The method according to claim 1, wherein the concave part of the mold structure has a depth corresponding to a height of the spacer.

6. The method according to claim 5, wherein the depth of the concave part of the mold structure ranges from 10 to 30 μm.

7. The method according to claim 1, wherein the resin material is a photocurable polymer precursor.

8. The method according to claim 7, wherein the photocurable polymer precursor contains a crosslinking agent.

9. The method according to claim 7, further comprising: after stamping the resin material using the mold structure to form the spacer pattern, irradiating light upon an outer surface of the first substrate to harden the spacer pattern.

10. A method for manufacturing a switchable 3D conversion device, comprising:

providing a first electrode on an inner surface of a first substrate;

applying a resin material on the first electrode to a predetermined thickness;

placing a mold structure, which has a concave part formed with a predetermined depth therein, on the resin material;

stamping the resin material using the mold structure, in order to form a spacer pattern;

dry etching the spacer pattern to form a spacer such that the first electrode is exposed at sides of the spacer;

forming a plurality of second electrodes, which are spaced from one another and have longitudinal axes in one direction, respectively, on a second substrate; and arranging the first and second substrates opposite to each other, forming a liquid crystal layer between the first and second substrates and bonding the first and second substrates, wherein the second electrodes include a first group and a second group that are separately provided on different layers by an interposing film therebetween;

wherein gaps between adjacent second electrodes in each of the different layers increase from a center to edges of a lens region;

wherein the concave part of the mold structure has a depth corresponding to a height of the spacer;

wherein the concave part of the mold structure ranges from 10 to 30 μm; and wherein the first electrode is exposed at sides of the spacer after dry etching such that the liquid crystal layer directly contacts the first electrode at the sides of the spacer after the liquid crystal layer is formed between the first and second substrates.

11. The method according to claim 10, wherein the spacer pattern includes a resin material having a predetermined shape filling the concave part, and residue remaining around the resin material.

12. The method according to claim 10, wherein the mold structure is fabricated by applying a mold resin to a back plane to a predetermined thickness, and facing a master mold having a convex part to the coated back plane to enable formation of the concave part corresponding to the convex part.

13. The method according to claim 10, wherein the dry etching of the spacer pattern to form the spacer is processed by cutting a front side of the spacer pattern to a predetermined thickness sufficient to remove the residue.

14. The method according to claim 13, wherein oxygen plasma is applied during the dry etching.

15. The method according to claim 10, wherein the resin material is a photocurable polymer precursor.

16. The method according to claim 15, wherein the photocurable polymer precursor contains a crosslinking agent.

17. The method according to claim 15, further comprising: after stamping the resin material using the mold structure to form the spacer pattern, irradiating light upon an outer surface of the first substrate to harden the spacer pattern.

* * * * *